United States Patent
Chen

(10) Patent No.: US 12,325,584 B2
(45) Date of Patent: Jun. 10, 2025

(54) FLIP TRASH CAN

(71) Applicant: EKO GROUP LTD, Jiangmen (CN)

(72) Inventor: Yizhi Chen, Jiangmen (CN)

(73) Assignee: EKO GROUP LTD, Jiangmen (CN)

( * ) Notice: Subject to any disclaimer, the term of this patent is extended or adjusted under 35 U.S.C. 154(b) by 146 days.

(21) Appl. No.: 18/353,039

(22) Filed: Jul. 14, 2023

(65) Prior Publication Data

US 2023/0356932 A1 Nov. 9, 2023

(30) Foreign Application Priority Data

Apr. 3, 2023 (CN) .......................... 202320718811.X

(51) Int. Cl.
*B65F 1/16* (2006.01)
(52) U.S. Cl.
CPC ............ *B65F 1/1615* (2013.01); *B65F 1/163* (2013.01); *B65F 2220/124* (2013.01)
(58) Field of Classification Search
CPC .. B65F 1/1615; B65F 1/163; B65F 2220/124; B65F 2220/12; B65F 1/1646; B65F 1/06; B65F 1/02; B65F 1/16; B65F 43/163; B65F 43/166; B65F 43/262; Y02W 30/10
USPC ..... 220/200, 810, 908, 495.06, 495.08, 263, 220/836, 843, 259.2, 259.1, 254.1, 255, 220/256.1
See application file for complete search history.

(56) References Cited

U.S. PATENT DOCUMENTS 5,150,806 A * 9/1992 Glomski ............. E05D 11/1028
220/908

FOREIGN PATENT DOCUMENTS

| CN | 218840588 U | 4/2023 | |
|---|---|---|---|
| EP | 1535863 A1 * | 6/2005 | ............. B65F 1/163 |
| WO | WO-9849073 A1 * | 11/1998 | ............. B65F 1/1473 |

* cited by examiner

*Primary Examiner* — Don M Anderson
*Assistant Examiner* — Laura E. Parker

(57) ABSTRACT

A flip trash can, including: a trash can body for containing trash, a lid, a locking member, a clamping piece on the locking member, a clamping portion on the lid and a flip-limiting structure. The lid and the locking member are hingedly connected to an opening of the trash can body, and arranged coaxially through the hinged shaft. The clamping piece is matched with the clamping portion. The clamping piece is configured to engage with or disengage from the clamping portion to respectively realize engagement and disengagement between the lid and the locking member. The flip-limiting structure is connected to the locking member to drive the locking member to turn over relative to the trash can body, thereby driving the lid to turn over relative to the trash can body.

13 Claims, 13 Drawing Sheets

FLIP TRASH CAN

CROSS-REFERENCE TO RELATED APPLICATIONS

This application claims the benefit of priority from Chinese Patent Application No. 202320718811.X, filed on Apr. 3, 2023. The content of the aforementioned application, including any intervening amendments thereto, is incorporated herein by reference in its entirety.

TECHNICAL FIELD

This application relates to trash cans, and more particularly to a flip trash can.

BACKGROUND

Flipping trash cans have a lid hingedly connected to the trash container. However, the excessive size will greatly increase the transportation cost if the trash cans are transported in a well-assembled form. In this case, most of the trash can products are transported in the way of "a number of trash can bodies are stacked, and a number of trash can lids are put together in a trash can body on the top". That is to say, the semi-finished trash can assembly requires to be assembled for the second time by the seller or the user after being transported to the destination. Due to the demand of secondary assembly, it is of great significance for product design to improve the convenience and learnability of assembly between the lid and the trash can body.

The lid and the trash can body in the existing flip trash can that needs to be assembled are generally provided with the cylindrical clamping block and the corresponding clamping hole to form a rotary clamping, thereby achieving the convenient assembly of the rotating structure.

In some trash cans, the clamping blocks and the corresponding clamping holes are respectively arranged in the non-elastic areas of the trash can head and the trash can body to ensure the structural strength. Consequently, a user needs to exert great strength to press the clamping blocks into the clamping holes during assembly, resulting in extremely poor user's experience. Moreover, the requirement on the production precision of the clamping block's size is extremely high. When the clamping block's size is too large, the assembly fails to be achieved, and when the clamping block's size is too small, the clamping block is easy to loosen and fall off.

For the purpose of simplifying the assembly, the other part of the trash cans is additionally provided with a sheet-shaped structure or a C-shaped buckle which is thinner and can be elastically deformed. In these trash cans, the clamping block or the clamping hole is arranged on the sheet-shaped structure, or the C-shaped buckle is employed as a clamping and fixing structure. In this case, when a user applies a little force during assembly, the sheet-shaped structure or the C-shaped buckle can be elastically deformed so as to smoothly form rotational clamping. However, the clamping block and the clamping hole are the main stress-bearing structures when turning over, while the sheet-shaped structure or the C-shaped buckle obviously has weaker strength. Consequently, frequent turning over is prone to cause deformation or breakage, thereby the lid is easy to loosen and separate from the trash can body or fails to be turned over normally.

In conclusion, it is particularly necessary to design a trash can assembly which is convenient for multiple trash can bodies to be stacked, firmly installed and simply assembled.

Applicant's Chinese Patent Application No. 2022230593078 discloses a trash can with a decorative ring and a simply-assembled lid, including a trash can body and a lid that are arranged separately, so that the trash can body can be stacked. In this trash can, a decorative ring and at least one rotatable connecting piece are preinstalled at the opening of the trash can, and the arrangement of the decorative ring and the connecting piece does not hinder the stacking of the trash can bodies. The connecting piece is set as a connecting piece of the lid. A matched clamping structure is arranged between the connecting piece of the lid and the lid, so that the rotatable connecting piece is preinstalled at the opening of the trash can. In this case, a user only needs to simply install the intuitive clamping structure. Moreover, since the manufacturer more professional in assembly, the rotating structure can be designed into a structure which has higher structural strength, and is more difficult to be installed to ensure the long service life of the rotating connection structure, while the clamping structure of the non-main stress structure can be designed into a structure which has relatively weaker strength, and is convenient and to install, so as to improve the user's experience.

However, in the process of product iteration, it is found that the trash can product still can be improved in the following aspects.

(1) The applicant's trash can product is sold overseas. Through research and feedback from dealer, it is found that due to the high labor cost of large supermarkets (such as Wal-Mart, Costco, etc.), the staff will not assemble the semi-finished components transported to the site in batches, but directly stack them for sale. Because a plurality of trash can lids are put together in the trash can body at the top, the staff is prone to miss or take away all the lids when packing for customers or when customers take them by themselves, resulting in the loss of the supermarkets or the requirements for users to carry out after-sales operations. In this can, a design requirement that trash cans should be sold with "one trash can body and one trash can lid" is put forward.

(2) In the above-mentioned application, the lid is a completely independent component, and the user needs to insertably install the connecting piece to the lid after getting the trash can components. Although a relatively simple and intuitive structural design has been realized, there are some cases in which the components are deformed or broken due to strong insertion by the user without aligning the components. The design of household products is a process for constantly refining humanized design for users. Therefore, the applicant believes that the installation structure serving users can still be improved.

SUMMARY

An objective of this application is to provide a flip trash can to remedy the insufficiency in the existing technologies.

Technical solutions of this application are described as follows.

This application provides a flip trash can, comprising:
a trash can body;
a lid;
a locking member;
a clamping piece;
a clamping portion; and
a flip-limiting structure;

wherein the trash can body is configured to receive and accommodate trash; an inner diameter of the trash can body increases from bottom to top;

the lid is hingedly connected to an opening of the trash can body;

the locking member is hingedly connected to the opening of the trash can body;

the lid is coaxially arranged with the locking member through a hinged shaft;

the clamping piece is provided on the locking member; the clamping portion is provided on the lid, and is matched with the clamping piece;

the clamping piece is configured to be engaged with the clamping portion to realize snap-fit connection between the lid and the locking member, and is also configured to be disengaged from the clamping portion to realize disengagement of the lid from the locking member; when the clamping piece is disengaged from the clamping portion, the lid is disengaged from the locking member, and the lid is capable of turning over relative to the trash can body, and being hung on a side of the trash can body; and when the lid is hung on the side of the trash can body, an avoidance space is arranged between the lid and the trash can body for stacking of another trash can;

the flip-limiting structure is connected to the locking member for driving the locking member to turn over relative to the trash can body, so as to drive the lid to turn over relative to the trash can body when the lid is in snap-fit connection with the locking member; and the flip-limiting structure is also configured to limit a rotation angle of the locking member relative to the trash can body, so as to limit a rotation angle of the lid relative to the trash can body when the lid is in snap-fit connection with the locking member; and a maximum rotation angle of the lid relative to the trash can body when the lid is disengaged from the locking member is larger than a maximum rotation angle of the lid relative to the trash can body under limit of the flip-limiting structure.

In an embodiment, the locking member has a plate-shaped structure; and the locking member comprises a first side surface, a second side surface and a third side surface, wherein the first side surface and the second side surface are respectively arranged at two ends of the third side surface; the first side surface and the second side surface are located on the same side along a thickness direction of the third side surface; the first side surface is parallel to the second side surface; and the third side surface is perpendicular to the first side surface.

In an embodiment, the clamping piece is elastic; the number of the clamping piece is at least two; at least two clamping pieces are respectively provided on the first side surface and the second side surface; a spacing is arranged between any two clamping pieces of the at least two clamping pieces that are arranged oppositely, such that the two clamping pieces that are arranged oppositely are capable of undergoing elastic deformation to be close to each other to realize engagement between the at least two clamping pieces and the clamping portion or away from each other to realize disengagement.

In an embodiment, the at least two clamping pieces each comprise a hook part and a connecting part; the hook part protrudes from the connecting part along a thickness direction of the connecting part, and is configured to be clamped in the clamping portion; the at least two clamping pieces comprise a first clamping piece and a second clamping piece; a hook part of the first clamping piece and a hook part of the second clamping piece are arranged back to back; a connecting part of the first clamping piece is arranged on the first side surface, and a connecting part of the second clamping piece is arranged on the second side surface.

In an embodiment, the number of the clamping portion is at least two; the at least two clamping pieces are clamped in at least two clamping portions in one-to-one correspondence; and the at least two clamping portions each comprise two rib sheets and an extending portion; the two rib sheets are oppositely arranged in parallel; the extending portion is parallel to the lid; the two rib sheets are perpendicularly arranged between the extending portion and the lid; and the two rib sheets and the extending portion encloses a clamping cavity for accommodating the hook part.

In an embodiment, the lid is provided with a groove for accommodating the locking member;

the groove comprises a first side wall, a second side wall and a top wall, wherein the first side wall and the second side wall are oppositely arranged in parallel; the first side wall and second side wall are perpendicular to the top wall, and are respectively arranged at two ends of the top wall; and an opening of the groove is opposite to the top wall, and is configured for allowing the locking member to enter the groove; the number of the at least two clamping portions is two, and two clamping portions are respectively arranged on the first side wall and the second side wall; a side of the extending portion of one of the two clamping portions is connected to the first side wall, and a side of the extending portion of the other of the two clamping portions is connected to the second side wall.

In an embodiment, the top wall is elastic; and the top wall is in snap-fit connection with the third side surface.

In an embodiment, the lid further comprises two hinged cylinders; one of the two hinged cylinders is arranged at an end of the first side wall away from the top wall, and the other of the two hinged cylinders is arranged at an end of the second side wall away from the top wall; and the locking member further comprises a rotating shaft cylinder; the rotating shaft cylinder is arranged opposite to the top wall; the first side surface and the second side surface are respectively arranged at two ends of the rotating shaft cylinder; the two hinged cylinders are respectively arranged at two sides of the rotating shaft cylinder; and the two hinged cylinders are coaxially connected to the rotating shaft cylinder through the hinged shaft.

In an embodiment, the flip-limiting structure comprises a pedal and a linkage push rod; the pedal is arranged on an outer side wall of a bottom end of the trash can body; a bottom end of the linkage push rod is connected to the pedal; a top end of the linkage push rod is connected to the locking member; and the pedal is configured for driving the linkage push rod to reciprocate along a vertical direction to drive the locking member to turn over relative to the trash can body, so as to drive the lid to turn over relative to the trash can body when the lid is in snap-fit connection with the locking member.

In an embodiment, the flip-limiting structure further comprises a lever; and one end of the lever is connected to the pedal, and the other end of the lever is connected to the bottom end of the linkage push rod.

In an embodiment, the outer side wall of the bottom end of the trash can body is provided with an accommodating slot; the pedal is arranged in the accommodating slot; and the pedal is configured to rotate relative to the lever to allow the pedal to turn over relative to the trash can body, so as to allow the pedal to be accommodated in the accommodating slot.

In an embodiment, an outer side wall of the trash can body is provided with a vertical groove; the vertical groove is arranged opposite to the accommodating slot; and the linkage push rod is arranged in the vertical groove.

In an embodiment, the flip-limiting structure further comprises a connecting seat; the connecting seat is arranged on the locking member; the connecting seat is provided with a first shaft hole and a second shaft hole; an axis of the first shaft hole and an axis of the second shaft hole are parallel to the hinged shaft; a height of the axis of the second shaft hole relative to the locking member is higher than a height of the axis of the first shaft hole relative to the locking member; the first shaft hole is communicated with the second shaft hole; the first shaft hole and the second shaft hole each have an L-shaped cross-section along an axial direction; and the top end of the linkage push rod is insertedly provided in the first shaft hole or the second shaft hole.

Compared with the prior art, this application has the following beneficial effects.

Under an unassembled state, the lid is still hingedly connected to the trash can body, which does not prevent the trash can body from being stacked, so as to facilitate controlling of the transportation volume, and save the transportation cost.

For the lid and the locking member which can coaxially rotate, they can be pre-assembled on the trash can body during the hinging step of production and assembly. In this case, they can be sold in a matching form of "one trash can lid and one trash can body", so as to avoid the omission and wrong taking of the trash can components. Moreover, there is no need for extra assembly steps to match the separated trash can lid with the trash can body in one-to-one correspondence, which reduces the assembly cost and the labor cost.

The coaxial design of the trash can also ensure that the lid and the locking member can only be assembled by turning fit. Namely, there is only one assembly path, where the lid and the locking member can be easily locked by applying a little force, so that the real eye-closed and fool-proof assembly operation is realized, improving user's experience.

Figure 1:
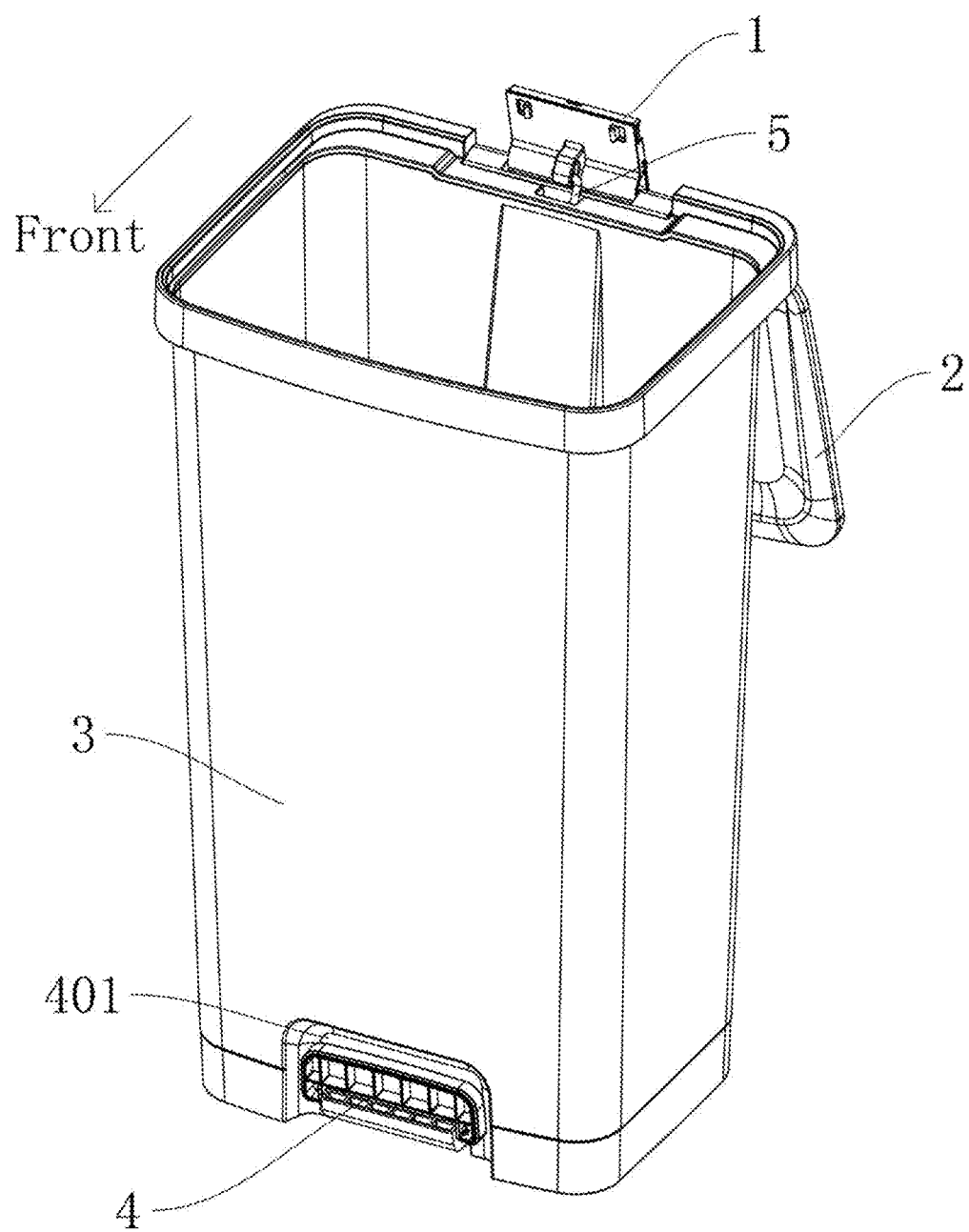
FIG. 1 is a structural diagram of a flip trash can (unassembled state) according to this application.
Figure 2:
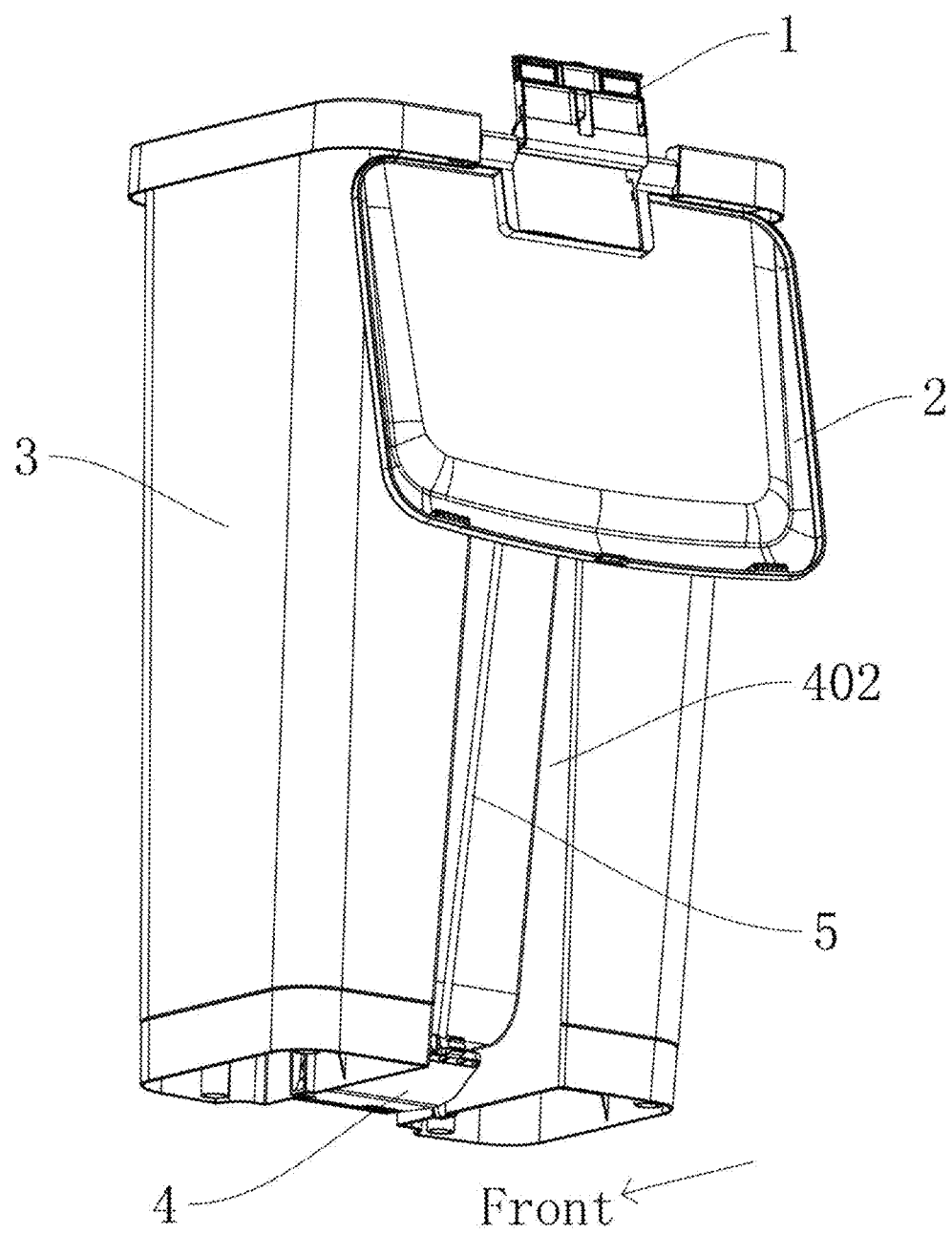
FIG. 2 is a structural diagram of the flip trash can (unassembled state) according to this application.
Figure 3:
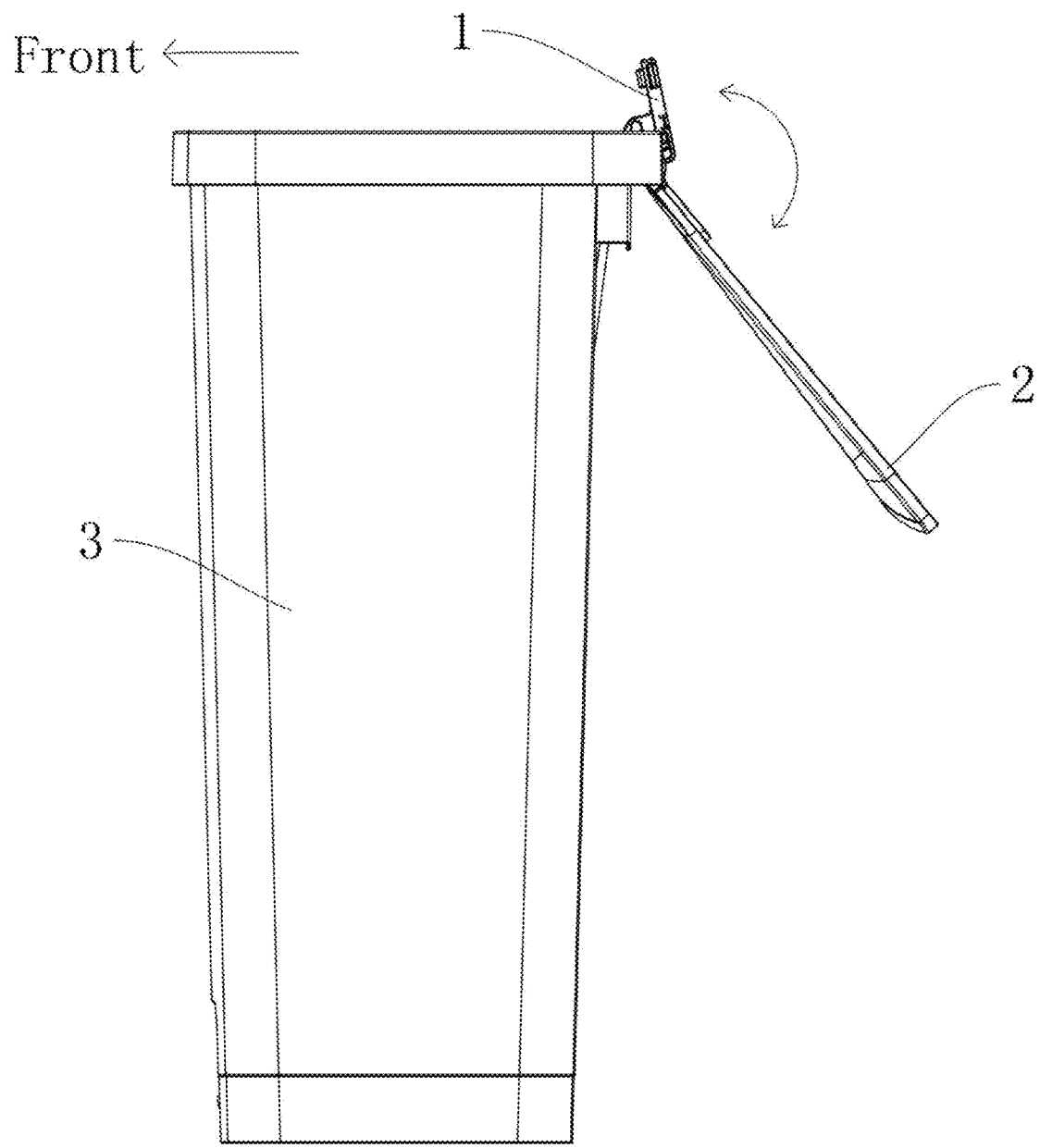
FIG. 3 schematically shows an assembling direction of the flip trash can according to this application.
Figure 4:
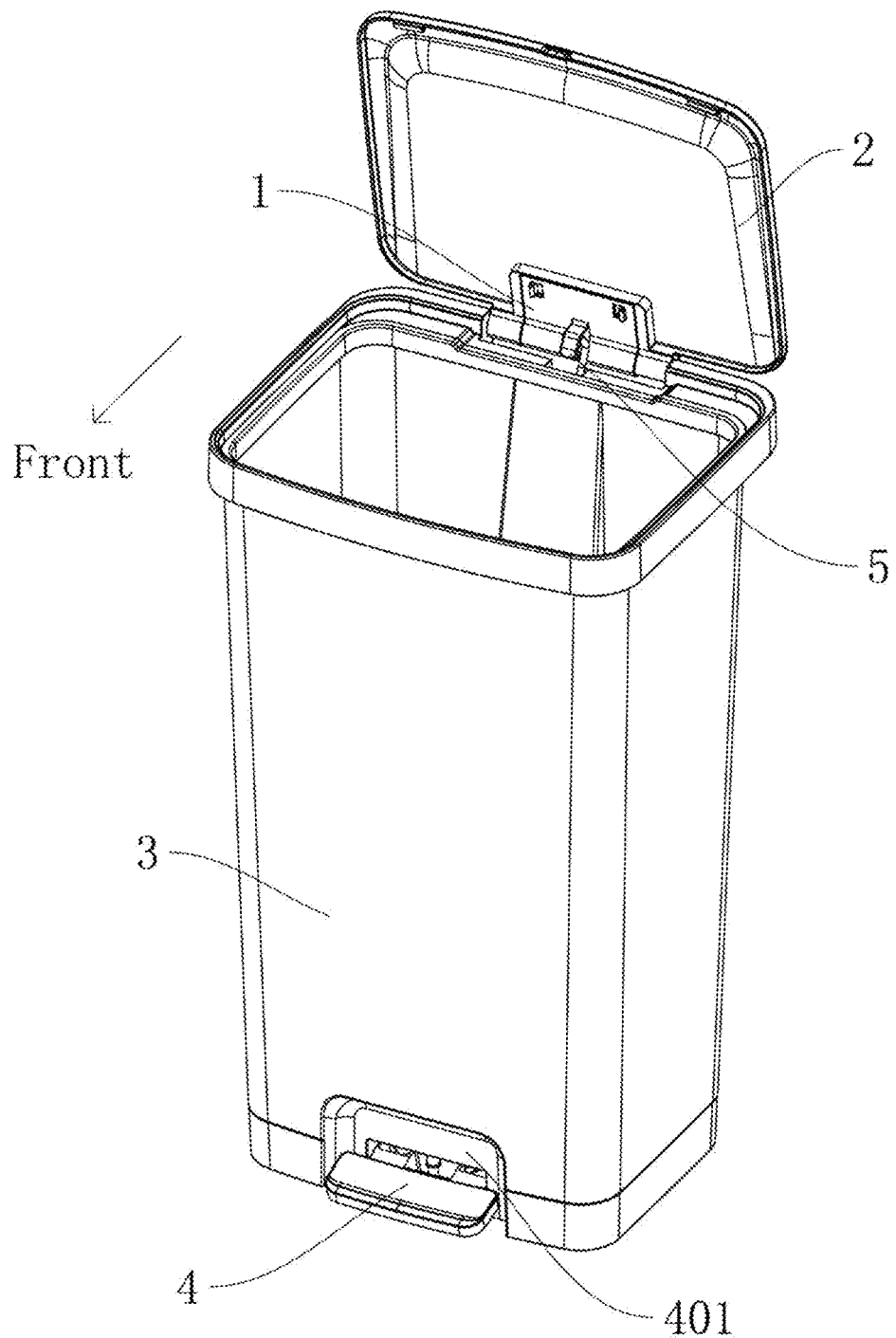
FIG. 4 is a structural diagram of the flip trash can (assembled state) according to this application.
Figure 5:
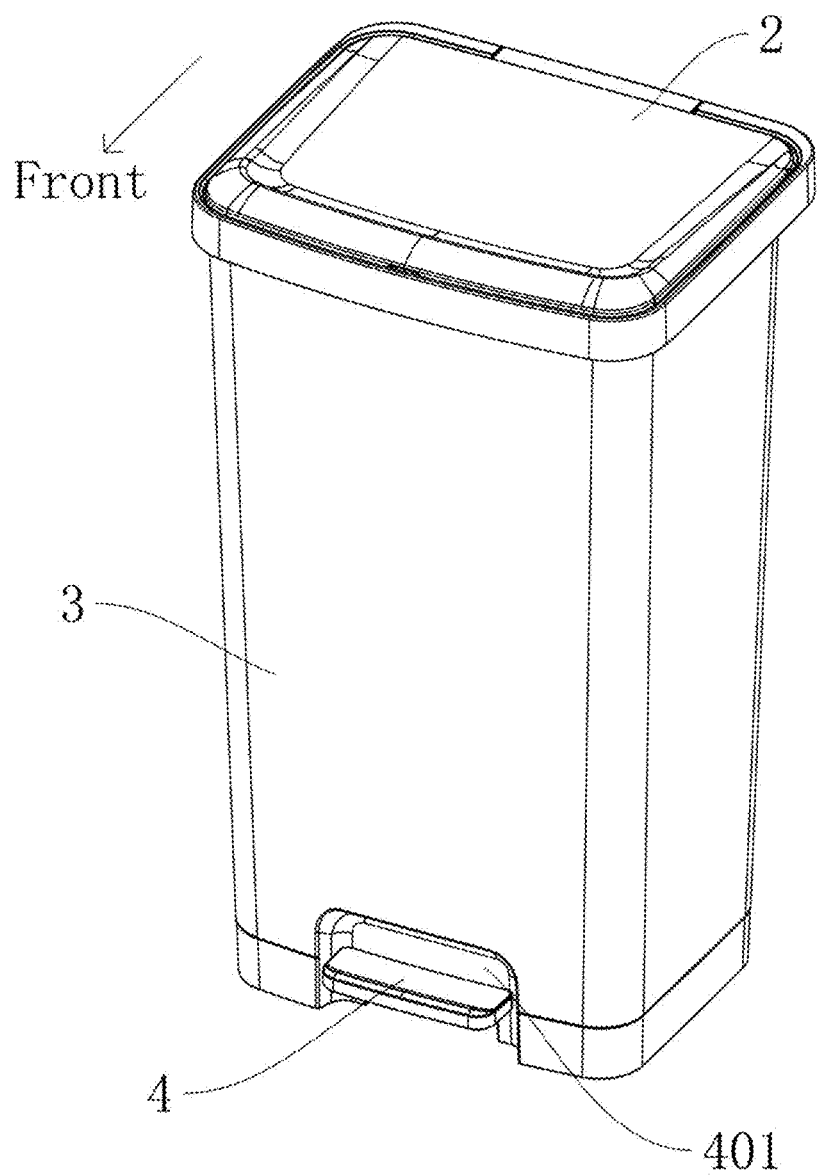
FIG. 5 is a structural diagram of the flip trash can (closed state) according to this application.
Figure 6:
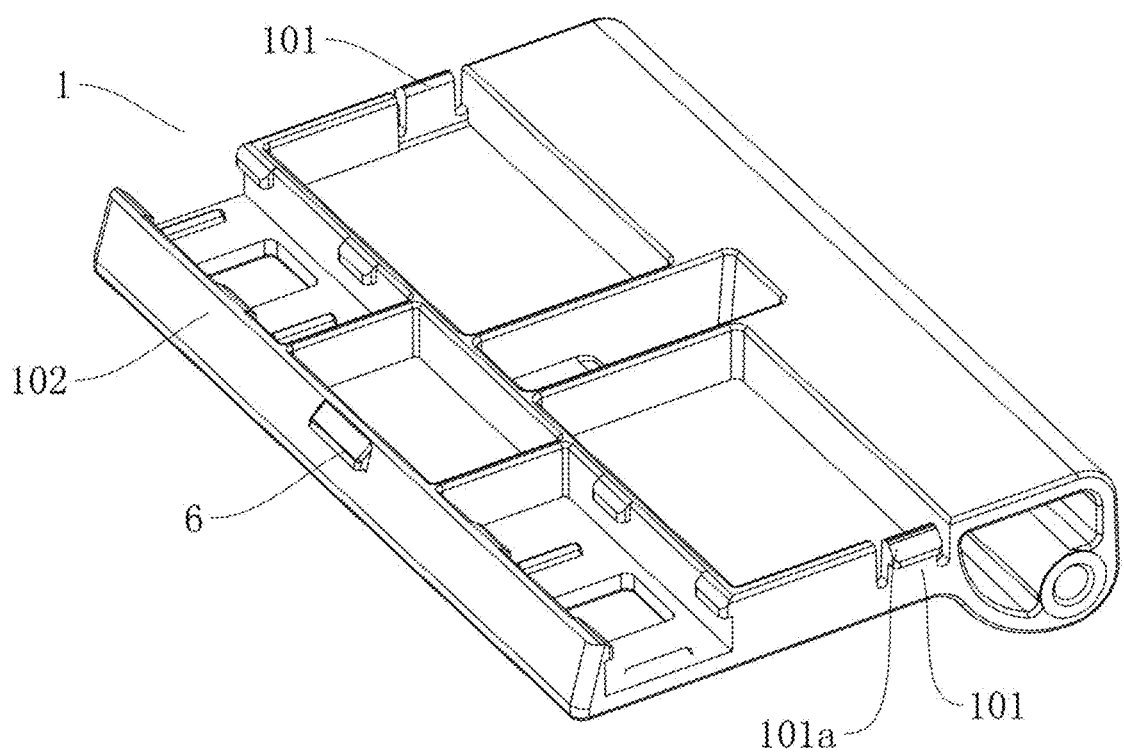
FIG. 6 is a structural diagram of a locking member according to this application.

In the drawings,
- 1, locking member; 101, clamping piece; 101*a*, hook part; 101*b*, connecting part; 102, third side surface; 103, rotating shaft cylinder; 104, first side surface; 105, second side surface; 106, bottom wall;
- 2, trash can lid; 201, clamping portion; 202, rib sheet; 203, top wall; 204, groove; 204*a*, first side wall; 204*b*, second side wall; 204*c*, opening; 205, hinged cylinder; 206, extending portion;
- 3, trash can body; 401, accommodating slot; 402, vertical groove;
- 4, pedal; 41, lever;
- 5, linkage push rod;
- 6, clamping block;
- 7, connecting seat; 71, first shaft hole; 72, second shaft hole; and
- 8, hinged shaft.

DETAILED DESCRIPTION OF EMBODIMENTS

This application will be described in detail below with reference to the accompanying drawings in the embodiments of this application to make the technical solutions clearer and complete. Obviously, described below are merely some embodiments of this application, and are not intended to limit this application. Based on the following embodiments, for those of ordinary skill in the art, other embodiments can be obtained without paying creative effort shall fall within the scope of this application defined by the appended claims.

It should be noted that as used herein, directional indications or positional relationships described by terms, such as "center", "longitudinal", "transverse", "length", "width", "thickness", "up", "down", "front", "back", "left", "right", "vertical", "horizontal", "top", "bottom", "inside", "outside", "clockwise", "counter-clockwise" are orientations and position relationships shown in the accompanying drawings. These terms are merely intended to facilitate simplify the description of this application, but not to indicate or imply that the referred devices or elements must have specific orientations, or must be constructed, or operated in a particular orientation, and thus cannot be understood as the limitations of this application.

As shown in FIGS. 1-13, a flip trash can includes a trash can body 3, a lid 2, a locking member 1, a clamping piece 101, a clamping portion 201 and a flip-limiting structure. The trash can body 3 is configured to receive and accommodate trash. An inner diameter of the trash can body 3 gradually increases from bottom to top. A plurality of trash can bodies can be stacked. The lid 2 and the locking member 1 are pre-assembled at an opening of the trash can body 3. The lid 2 and the locking member 1 are hingedly connected to the trash can body 3. The clamping piece 101 is provided on the locking member 1. The clamping portion 201 is provided on the lid 2, and is matched with the clamping piece 101. When the clamping piece 101 is disengaged from the clamping portion 201, the lid 2 and the locking member are under an unassembled state. The lid 2 is capable of completely turning over backwards and hung on a back side of the trash can body 3. At this time, an avoidance space arranged between the lid 2 hung on the trash can body 3 and the trash can body 3, and an avoidance space in another trash can are stacked in sequence. The lid 2 that is turned backward does not hinder the stacking of a plurality of trash can bodies.

The locking member 1 includes or is connected to a flip-limiting structure. The lid 2 is coaxially connected to the locking member 1. The flip-limiting structure is configured to drive the locking member 1 to turn over relative to the trash can body 3, so as to drive the lid 2 to turn over relative to the trash can body 3 when the lid 2 is in snap-fit connection with the locking member 1. When the lid 2 is close to the locking member 1, the locking member 1 is pressed towards the lid 2, such that the clamping piece 101 is engaged on the clamping portion 201, and the lid 2 and the locking member 1 are under an assembled state. A maximum rotation angle of the lid 2 relative to the trash can body 3 when the lid is disengaged from the locking member 1 is larger than a maximum rotation angle of the lid relative to the trash can body 3 under limit of the flip-limiting structure, so that the rotational trajectory of the lid 2 is limited by the locking member 1, and the lid 2 fails to be completely turned backward and hung on the back side of the trash can body 3.

Firstly, the unassembled trash can lid is still hingedly connected to the trash can body 3, but does not hinder the trash can body 3 from being stacked, facilitating the controlling of the transportation volume, and saving the transportation cost.

Secondly, the lid 2 and the locking member 1 that rotate coaxially are pre-assembled on the trash can body 3 together through hinged connecting step during the production assembly. In this case, the trash cans are placed and sold in a matching form of 'one trash can body and one trash can lid', so as to avoid the omission and wrong taking of a plurality of trash can lids. Moreover, there is no need for extra assembly steps to match the separated trash can lid with the trash can body in one-to-one correspondence, reducing the assembly cost and the labor cost.

Finally, the coaxial design allows the lid 2 and the locking member 1 to be only assembled through turning fit. That is, there is only one assembly path where the lid and the locking member can be easily locked by applying a little force, so that the real eye-closed and fool-proof assembly operation is realized, improving user's experience.

It should be noted that the structural design of the lid 2 and the locking member 1 in this application is suitable for various types of trash cans with flip lids, such as trash can with manually-opened lid, trash can with pedal opened lid, trash can with induction opening lid, etc. The core of the locking member 1 is that it has small size and can replace the larger trash can lid 2 to connect with other parts of the trash can. Moreover, the trash can includes or is connected to a flip-limiting structure for preventing the lid 2 from overturning during use.

Figure 7:
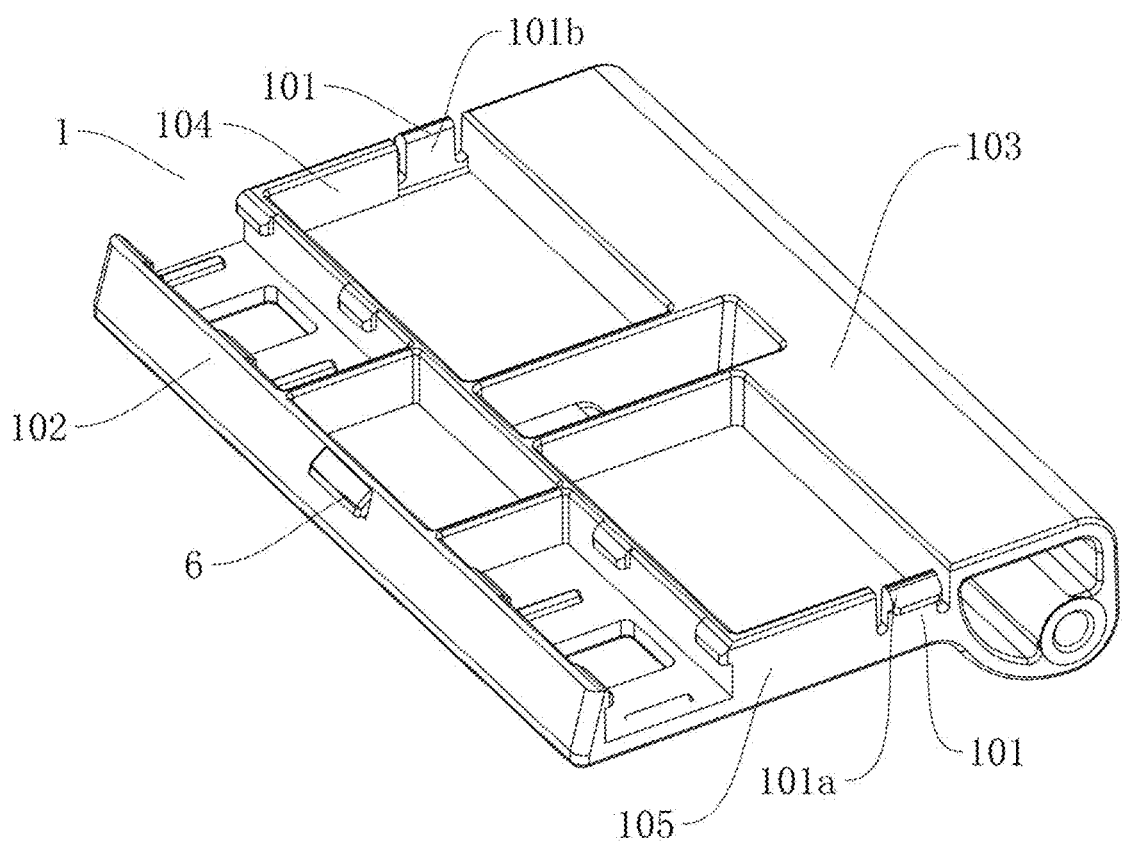
FIG. 7 is another structural diagram of the locking member according to this application.
Figure 8:
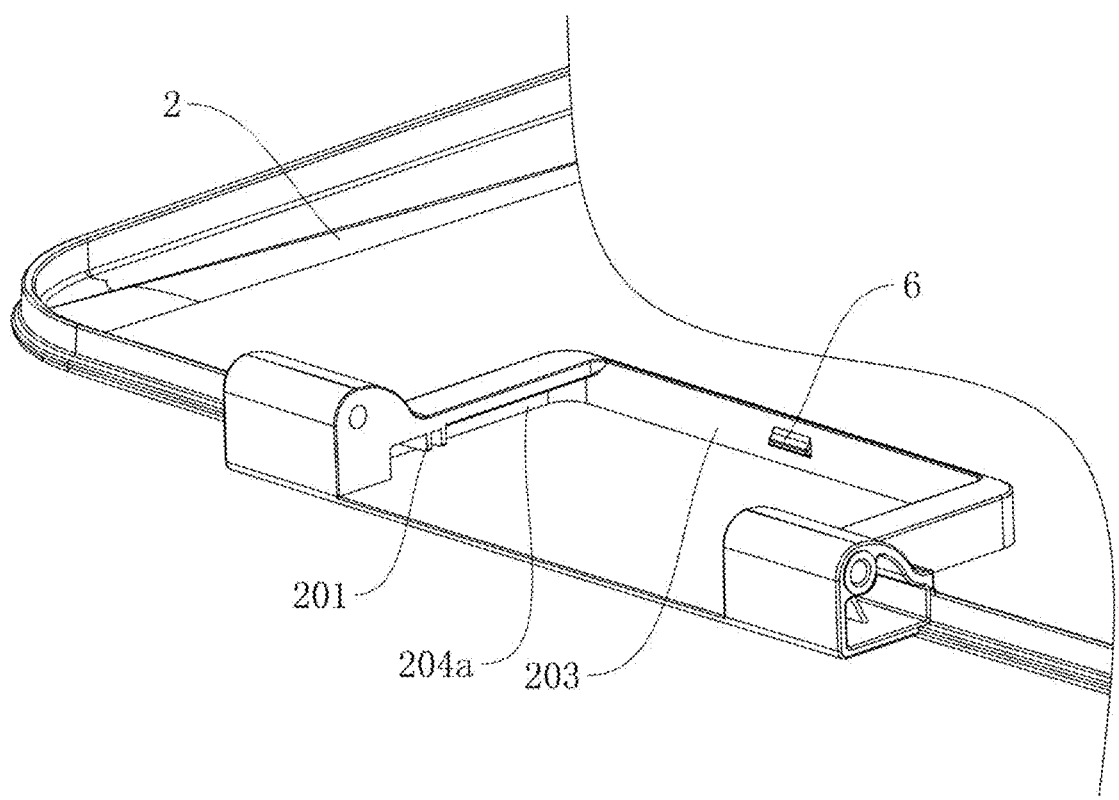
FIG. 8 is a schematic diagram showing partial structure of a lid according to this application.
Figure 9:
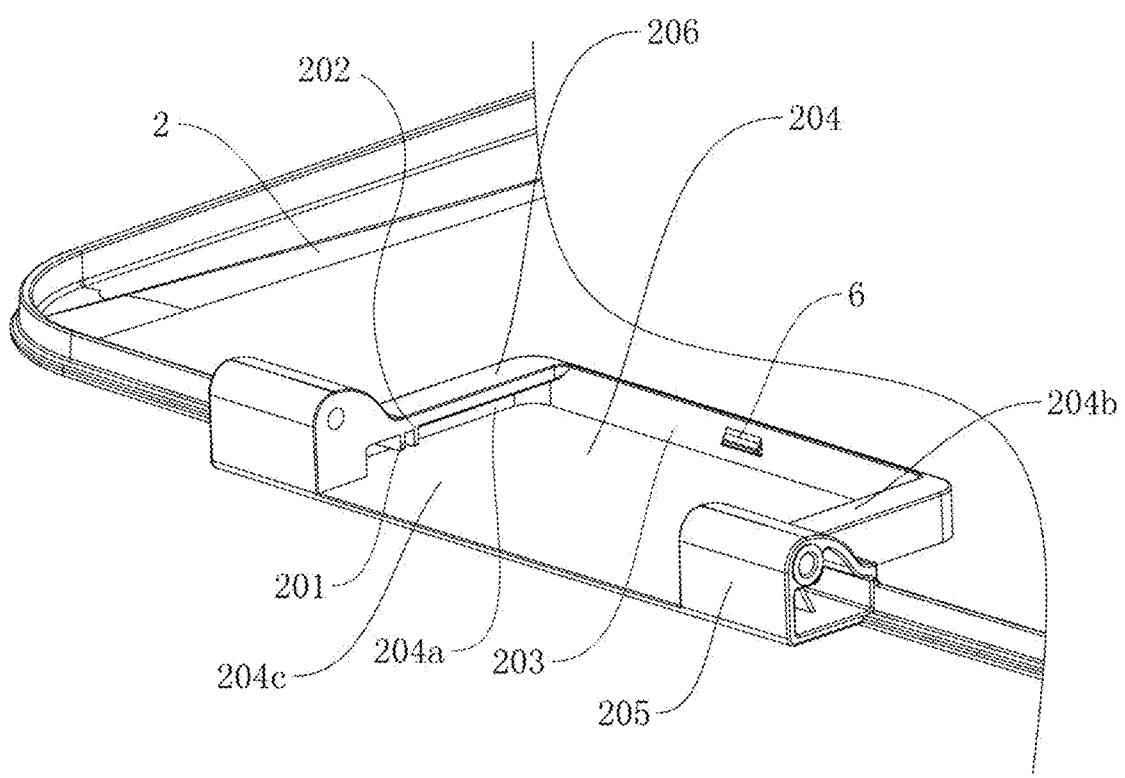
FIG. 9 is another schematic diagram showing partial structure of the lid according to this application.
Figure 10:
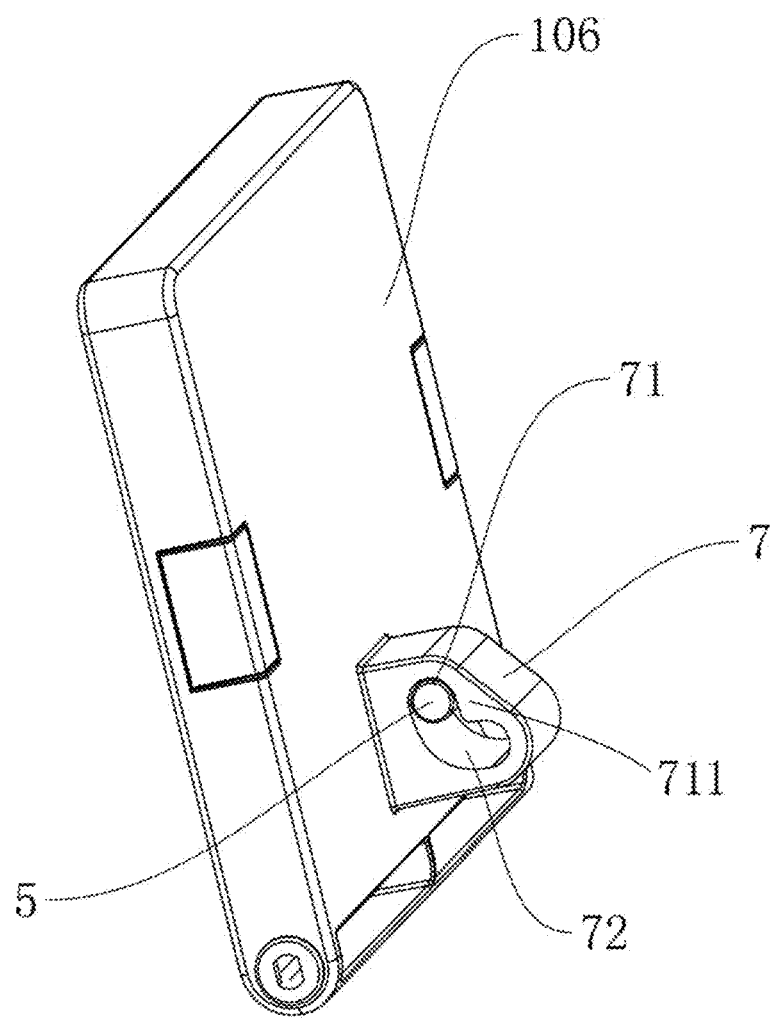
FIG. 10 is a schematic diagram showing a structure of the locking member and a connecting seat of this application.
Figure 11:
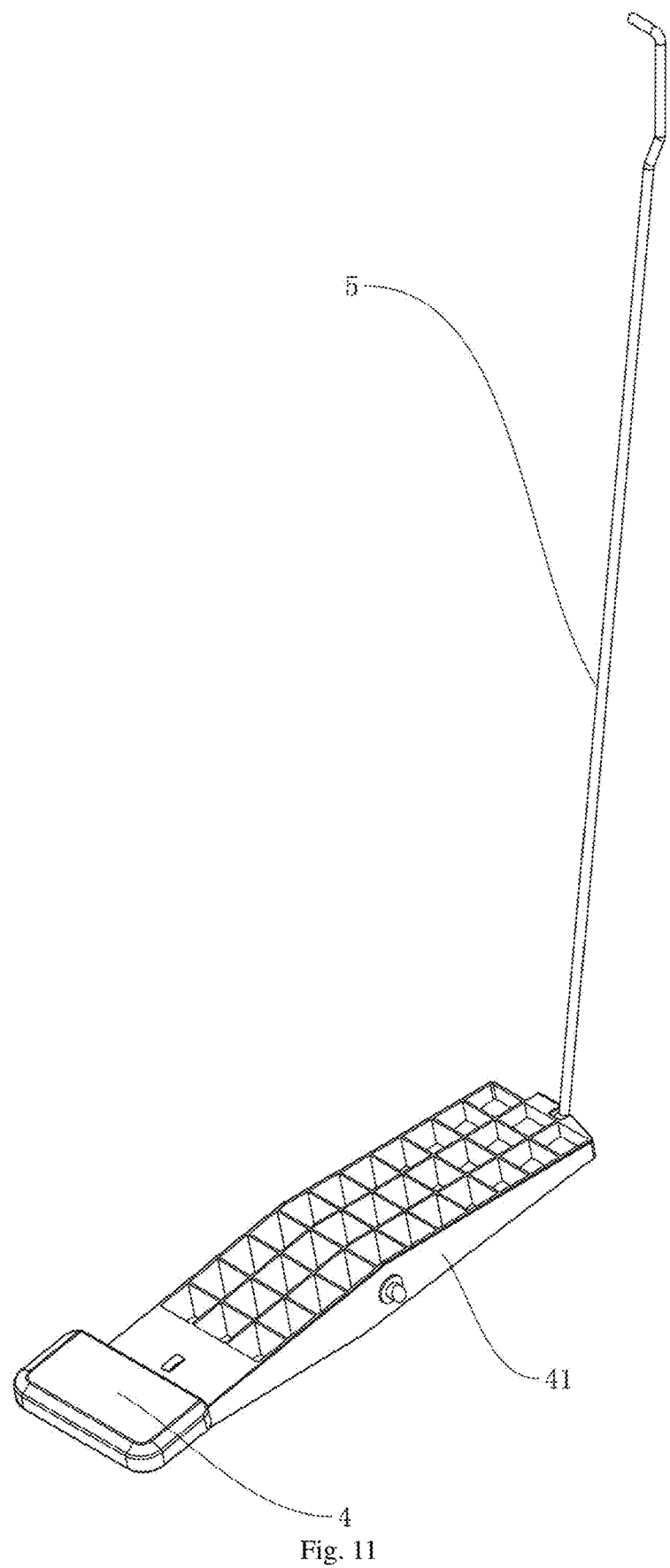
FIG. 11 is a schematic diagram showing a structure of a flip-limiting structure according to this application.
Figure 12:
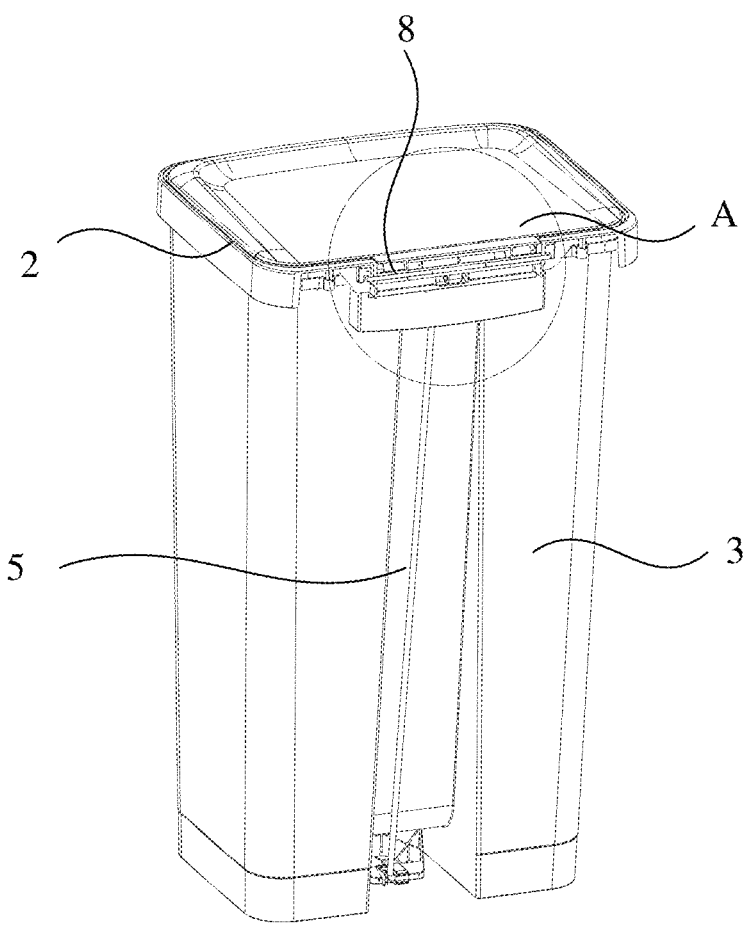
FIG. 12 is a structural diagram of the flip trash can according to this application.
Figure 13:
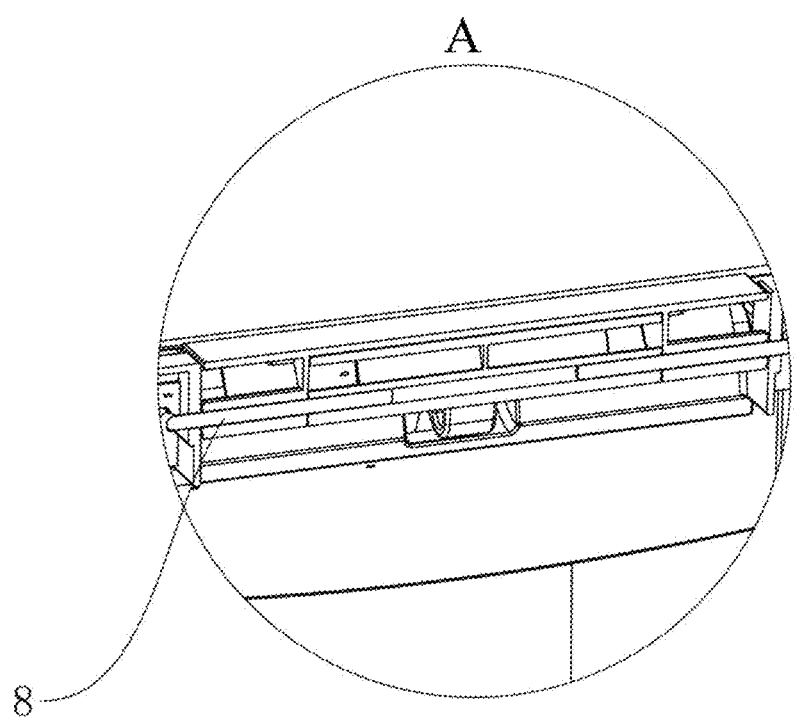
FIG. 13 is an enlarged view of part A in FIG. 12 according to this application.

Referring to an embodiment shown in FIG. 7, the locking member 1 has a plate-shaped structure. The locking member 1 includes a first side surface 104, a second side surface 105 and a third side surface 102. The first side surface 104 and the second side surface 105 are respectively arranged at two ends of the third side surface 102, and are located on the same side along the thickness direction of the third side surface 102. The first side surface 104 is parallel to the second side surface 105. The third side surface 102 is perpendicular to the first side surface 104.

In this embodiment, the clamping piece 101 is elastic. The number of the clamping piece 101 is two. The two clamping pieces 101 are respectively provided on the first side surface 104 and the second side surface 105. A spacing is arranged between the two clamping pieces 101, so that the two clamping pieces 101 are capable of undergoing elastic deformation to be close to or away from each other to realize the engagement or disengagement between the two clamping pieces 101 and the clamping portion 201.

Specifically, the two clamping pieces 101 each have various schemes. For example, an elastically-deformable rubber part, a part with a spring structure, and a part designed to be thin enough to be elastically deformable. In this embodiment, the two clamping pieces each 101 include a hook structure, which is simple in structure and easy to produce. The hook structure is capable of undergoing elastic deformation to be engaged in the clamping portion 201.

The clamping piece 101 (i.e., the hook structure) is configured to be provided on the lid 2. In this case, the clamping portion 201 is provided on the locking member 1.

The two clamping pieces 101 each include a hook part 101a and a connecting part 101b. The hook part 101a protrudes from the connecting part along the thickness direction of the connecting part 101b, and is configured to be clamped in the clamping portion 201. The hook parts 101a of the two clamping pieces 101 are arranged back to back. The connecting parts 101b of the two clamping pieces 101 are respectively arranged on the first side surface 104 and the second side surface 105.

Specifically, the connecting part 101b of one of the two clamping pieces 101 and the connecting part 101b of the other of the two clamping pieces 101 are configured to move toward or away from each other to respectively drive the hook part 101a to reciprocate, so as to realize the engagement or disengagement between the hook part 101a and the clamping portion 201.

The number of the clamping portions 201 is two. The two clamping pieces 101 are clamped in the two clamping portions 201 in one-to-one correspondence. The two clamping portions 201 each include two rib sheets 202 and an extending portion 206. The two rib sheets 202 are oppositely arranged in parallel. The extending portion 206 is parallel to the lid 2. The two rib sheets 202 are perpendicularly arranged between the extending portion 206 and the lid 2. The two rib sheets 202 and the extending portion 206 encloses a clamping cavity for accommodating the hook part 101a.

The lid 2 is provided with a groove 204. When the clamping piece 101 is clamped to the clamping portion 201, the locking member 1 is accommodated in the groove 204. The groove 204 includes a first side wall 204a, a second side wall 204b and a top wall 203. The first side wall 204a and the second side wall 204b are oppositely arranged in parallel. The first side wall 204a and the second side wall 204b are perpendicular to the top wall, and are respectively arranged at two ends of the top wall 203. The groove 204 is also provided with an opening 204c. The opening 204c of the groove 204 is opposite to the top wall 203, and is configured for allowing the locking member 1 to enter the groove 204. The two clamping portions 201 are respectively arranged at the first side wall 204a and the second side wall 204b. A side of an extending portion 206 of one of the two clamping portions 201 is connected to the first side wall 204a, and a side of an extending portion 206 of the other of the two clamping portions 201 is connected to the second side wall 204b.

Specifically, the top wall 203 is elastic. The top wall 203 is connected to the third side surface 102 through a clamping structure. Through the slight elastic deformation of the top wall 203, the clamping of the clamping structure is realized, and the installation stability between the lid 2 and the locking member 1 is improved. More specifically, a bottom wall 106 of the locking member 1 after clamping is flush with an edge of a notch of the groove 204.

Specifically, the clamping structure has various schemes, for example, a clamping strip and a clamping groove that are matched with each other, and two clamping blocks 6 that are matched with each other (in this embodiment) and the like. In this embodiment, one of the two clamping blocks 6 is arranged on the top wall 203, and the other of the two clamping blocks 6 is arranged on the third side surface 102. A top end of the clamping block 6 at the third side surface 102 abuts against a bottom end of the clamping block 6 at the top wall 203 to realize the snap-fit connection between the top wall 203 and the third side surface 102.

It should be noted that other suitable automatic or manual assembly structures can be added between the locking member 1 and the lid 2 to ensure the stability of the connection.

The lid 2 further includes two hinged cylinders 205. One of the two hinged cylinders 205 is arranged at an end of the first side wall 204a away from the top wall 203, and the other of the two hinged cylinders 205 is arranged at an end of the second side wall 204b away from the top wall 203. The locking member 1 further includes a rotating shaft cylinder 103. The rotating shaft cylinder 103 is arranged opposite to the top wall 203. The first side surface 104 and the second side surface 105 are respectively arranged at two ends of the rotating shaft cylinder 103. The two hinged cylinders 205 are respectively arranged at two sides of the rotating shaft cylinder 103. The two hinged cylinders 205 are coaxially connected to the rotating shaft cylinder 103 through a hinged shaft 8.

In this embodiment, the extending portion 206 extends from an end of the hinged cylinder 205 near the groove 204 along the first side wall 204a or the second side wall 204b of the groove 204 to the top wall 203 of the groove 204. The extending portion 206 and the first side wall 204a or the second side wall 204b surrounds the clamping piece 101, so as to prevent the clamping piece 101, which is relatively weak in impact resistance and easy to hold dirt, from being exposed, and simplify the visible structure of the lid 2.

In this embodiment, taking the trash can with a pedal as an example, the technical solution of the present application is clearly and completely described below.

In this embodiment, the bottom of the trash can body 3 is rotatably connected to a pedal 4 for the user to step on. The pedal 4 is connected to the bottom end of a linkage push rod 5. The top end of the linkage push rod 5 is connected to the locking member 1. The linkage push rod and the pedal constitute a flip-limiting structure. The functions and structures of the linkage push rod 5 and the pedal 4 limit the rotation angle of the lid 2.

The flip-limiting structure further includes a lever 41. One end of the lever 41 is rotatably connected to the pedal 4, and the other end of the lever 41 is connected to the bottom end of the linkage push rod 5.

Specifically, the flip-limiting structure further includes a connecting seat 7. The locking member 1 further includes a bottom wall 106. The connecting seat 7 is perpendicularly arranged on the bottom wall 106 of the locking member 1. The connecting seat 7 is provided with a first shaft hole 71 and a second shaft hole 72. An axis of the first shaft hole 71 and an axis of the second shaft hole 72 are parallel to the hinged shaft 8 between the lid 2 and the locking member 1. A height of the axis of the second shaft hole 72 relative to the bottom wall 106 is higher than a height of the axis of the first shaft hole 71 relative to the bottom wall 106. In this embodiment, the height difference is at least equal to or greater than the diameter of the linkage push rod 5. The distance between the axis of the second shaft hole 72 and the hinged shaft 8 between of the lid 2 and the locking member 1 is smaller than the distance between the axis of the first shaft hole 71 and the hinged shaft 8 between of the lid 2 and the locking member 1, and a distance difference is at least greater than or equal to the diameter of the linkage push rod 5. The top end of the linkage push rod 5 is insertedly provided in the first shaft hole 71 or the second shaft hole 72. The first shaft hole 71 is communicated with the second shaft hole 72. The first shaft hole 71 and the second shaft hole 72 each have an L-shaped cross-section along an axial direction, such that the linkage push rod 5 is configured to be clamped in the first shaft hole 71 or the second shaft hole 72, thereby forming two clamping positions respectively.

When the lid 2 and the locking member 1 are assembled, and the linkage push rod 5 is arranged in the first shaft hole 71, the pedal 4 is pressed downwards to drive one end of the lever 41 to move downwards, and the other end of the lever 41 moves upwards. In this case, the linkage push rod 5 is jacked upwards, such that the top end of the linkage push rod 5 jacks up the locking member 1 in the first shaft hole 71, thereby driving the locking member 2 to turn over backwards. When the lid 2 is opened, the length of the linkage push rod 5 limits the position of the linkage push rod 5 when leaning against the back side of the trash can body 3. At this time, the rotation angle of the lid 2 relative to the trash can body 3 is less than 90 degrees. Moreover, The first shaft hole 71 and the second shaft hole 72 are communicated and each have L-shaped cross section, the linkage push rod 5 exerts a pulling force on the bottom 711 of the first shaft hole 71. Therefore, the shift of the center of gravity of the lid 2 caused by the backward turning of the lid 2 due to inertia is avoided. When the pedal 4 is released, the lid 2 and the linkage push rod 5 are configured to freely move downward due to their own gravity, so as to drive the locking member 1 to turn towards the opening of the trash can. At this time, the lid 2 is automatically closed.

When the lid 2 is manually turned over backwards, the linkage push rod 5 is configured to slide down into the second shaft hole 72, the rotation angle of the lid 2 relative to the trash can body 3 is greater than 90 degrees, and the center of gravity of the lid is shifted to the rear side of the hinge shaft 8. When the manual force is released, the lid is configured to receive a downward force and there is no force toward the front side of the hinge shaft 8, so that the opening state of the lid 2 relative to the trash can body 3 can still be maintained. The pedal 4 is connected to the lid 2 through the linkage push rod 5 and the locking member 1. A user can control the opening and closing of the lid 2 through the pedal 4 and the linkage push rod 5.

The pedal 4 can be a separate component. In order to simplify the assembly of the trash can by the user, the lid 3 and/or the pedal 4 is provided with a switching structure to allow the pedal to be optionally retracted or exposed. The pedal 4 is pre-assembled on the trash can body 3.

When the pedal 4 is not in use, the pedal 4 is configured to be retracted and not protrude out of the outer side wall of the trash can body 3. The pre-assembled pedal 4 does not hinder the stacking of the plurality of trash can bodies 3.

When the pedal 4 is in use, the pedal 4 is movable and exposed to the outside of the trash can body 3 for the user to step on.

The switching structure has various schemes. For example, the trash can body 3 is designed separately. The bottom of the trash can body 3 can be provided with a chute for the pedal 4 to slide backwards to be not exposed. For example, the pedal 4 is designed separately. The pedal 4 has a retractable-extendable two-section structure, such that the pedal is configured to be retracted to be not exposed.

In this embodiment, both the trash can body 3 and the pedal 4 are structurally designed. The bottom of the front side wall of the trash can body 3 is provided with an accommodating slot 401. The accommodating slot 401 is concave inward. The notch of the accommodating slot 401 is opened forward and downward.

The pedal 4 is configured to be turned upwards and rotatably retracted into the accommodating slot 401 (as shown in FIG. 1). The pedal 4 does not protrude from the outer side wall of the trash can body 3.

The accommodating slot 401 and the pedal 4 constitute a switching structure. The pedal 4 is rotatable.

In an embodiment, the linkage push rod 5 is also pre-assembled on the locking member 1 and the pedal 4. The back side wall of the trash can body 3 is recessed inwards to form a vertical groove 402. The linkage push rod 5 is arranged in the vertical groove 402. The linkage push rod 5 that is pre-assembled does not hinder the stacking of the plurality of trash can bodies 3.

Described above are merely illustrative of this application, and are intended to facilitate the understanding and implementation of this application. It should be understood that various changes or modifications of the above embodiments made by those skilled in the art without departing from the spirit and scope of this application shall fall within the scope of this application defined by the appended claims. Additionally, specific terms used herein are intended for facilitating the understanding of this application, and are not intended to limit this application.

What is claimed is:

1. A flip trash can, comprising:
    a trash can body;
    a lid;
    a locking member;
    at least one clamping piece;
    at least one clamping portion; and
    a flip-limiting structure;
    wherein the trash can body is configured to receive and accommodate trash; an inner diameter of the trash can body increases from bottom to top;
    the lid is hingedly connected to an opening of the trash can body;
    the locking member is hingedly connected to the opening of the trash can body;
    the lid is coaxially arranged with the locking member through a hinged shaft;
    each of the at least one clamping piece is provided on the locking member; each of the at least one clamping portion is provided on the lid, and is matched with each of the at least one clamping piece;
    each of the at least one clamping piece is configured to be engaged with each of the at least one clamping portion to realize snap-fit connection between the lid and the locking member, and is also configured to be disengaged from each of the at least one clamping portion to realize disengagement of the lid from the locking member; when each of the at least one clamping piece is disengaged from each of the at least one clamping portion, the lid is disengaged from the locking member, and the lid is capable of turning over relative to the trash can body, and being hung on a side of the trash can body; and when the lid is hung on the side of the trash can body, an avoidance space is arranged between the lid and the trash can body for stacking of another trash can;
    the flip-limiting structure is connected to the locking member for driving the locking member to turn over relative to the trash can body, so as to drive the lid to turn over relative to the trash can body when the lid is in snap-fit connection with the locking member; and the flip-limiting structure is also configured to limit a rotation angle of the locking member relative to the trash can body, so as to limit a rotation angle of the lid relative to the trash can body when the lid is in snap-fit connection with the locking member; and a maximum rotation angle of the lid relative to the trash can body when the lid is disengaged from the locking member is larger than a maximum rotation angle of the lid relative to the trash can body under limit of the flip-limiting structure.

2. The flip trash can of claim 1, wherein the locking member has a plate-shaped structure; and
    the locking member comprises a first side surface, a second side surface and a third side surface, wherein the first side surface and the second side surface are respectively arranged at two ends of the third side surface; the first side surface and the second side surface are located on the same side along a thickness direction of the third side surface; the first side surface is parallel to the second side surface; and the third side surface is perpendicular to the first side surface.

3. The flip trash can of claim 2, wherein each of the at least one clamping piece is elastic; the number of the clamping piece is at least two; at least two clamping pieces are respectively provided on the first side surface and the second side surface; a spacing is arranged between any two clamping pieces of the at least two clamping pieces that are arranged oppositely, such that the two clamping pieces that are arranged oppositely are capable of undergoing elastic deformation to be close to or away from each other to realize engagement or disengagement between the at least two clamping pieces and the clamping portion.

4. The flip trash can of claim 3, wherein the at least two clamping pieces each comprise a hook part and a connecting part; the hook part protrudes from the connecting part along a thickness direction of the connecting part, and is configured to be clamped in the clamping portion; the at least two clamping pieces comprise a first clamping piece and a second clamping piece; a hook part of the first clamping piece and a hook part of the second clamping piece are arranged back to back; a connecting part of the first clamping piece is arranged on the first side surface, and a connecting part of the second clamping piece is arranged on the second side surface.

5. The flip trash can of claim 4, wherein the number of the clamping portion is at least two; the at least two clamping pieces are clamped in at least two clamping portions in one-to-one correspondence; and
    the at least two clamping portions each comprise two rib sheets and an extending portion; the two rib sheets are oppositely arranged in parallel; the extending portion is parallel to the lid; the two rib sheets are perpendicularly arranged between the extending portion and the lid; and the two rib sheets and the extending portion encloses a clamping cavity for accommodating the hook part.

6. The flip trash can of claim 5, wherein the lid is provided with a groove for accommodating the locking member;
the groove comprises a first side wall, a second side wall and a top wall, wherein the first side wall and the second side wall are oppositely arranged in parallel; the first side wall and second side wall are perpendicular to the top wall, and are respectively arranged at two ends of the top wall; and
an opening of the groove is opposite to the top wall, and is configured for allowing the locking member to enter the groove; the number of the at least two clamping portions is two, and the two clamping portions are respectively arranged on the first side wall and the second side wall; a side of the extending portion of one of the two clamping portions is connected to the first side wall, and a side of the extending portion of the other of the two clamping portions is connected to the second side wall.

7. The flip trash can of claim 6, wherein the top wall is elastic; and the top wall is in snap-fit connection with the third side surface.

8. The flip trash can of claim 6, wherein the lid further comprises two hinged cylinders; one of the two hinged cylinders is arranged at an end of the first side wall away from the top wall, and the other of the two hinged cylinders is arranged at an end of the second side wall away from the top wall; and
the locking member further comprises a rotating shaft cylinder; the rotating shaft cylinder is arranged opposite to the top wall; the first side surface and the second side surface are respectively arranged at two ends of the rotating shaft cylinder; the two hinged cylinders are respectively arranged at two sides of the rotating shaft cylinder; and the two hinged cylinders are coaxially connected to the rotating shaft cylinder through the hinged shaft.

9. The flip trash can of claim 1, wherein the flip-limiting structure comprises a pedal and a linkage push rod; the pedal is arranged on an outer side wall of a bottom end of the trash can body; a bottom end of the linkage push rod is connected to the pedal; a top end of the linkage push rod is connected to the locking member; and the pedal is configured for driving the linkage push rod to reciprocate along a vertical direction to drive the locking member to turn over relative to the trash can body, so as to drive the lid to turn over relative to the trash can body when the lid is in snap-fit connection with the locking member.

10. The flip trash can of claim 9, wherein the flip-limiting structure further comprises a lever; and one end of the lever is connected to the pedal, and the other end of the lever is connected to the bottom end of the linkage push rod.

11. The flip trash can of claim 10, wherein the outer side wall of the bottom end of the trash can body is provided with an accommodating slot; the pedal is arranged in the accommodating slot; and the pedal is configured to rotate relative to the lever to allow the pedal to turn over relative to the trash can body, so as to allow the pedal to be accommodated in the accommodating slot.

12. The flip trash can of claim 11, wherein an outer side wall of the trash can body is provided with a vertical groove; the vertical groove is arranged opposite to the accommodating slot; and the linkage push rod is arranged in the vertical groove.

13. The flip trash can of claim 9, wherein the flip-limiting structure further comprises a connecting seat; the connecting seat is arranged on the locking member; the connecting seat is provided with a first shaft hole and a second shaft hole; an axis of the first shaft hole and an axis of the second shaft hole are parallel to the hinged shaft; a height of the axis of the second shaft hole relative to the locking member is higher than a height of the axis of the first shaft hole relative to the locking member; the first shaft hole is communicated with the second shaft hole; the first shaft hole and the second shaft hole form an L-shaped cross-section along an axial direction; and the top end of the linkage push rod is insertedly provided in the first shaft hole or the second shaft hole.

* * * * *